United States Patent [19]

Knapp

[11] 4,087,967
[45] May 9, 1978

[54] SLEEVE SPOOL VALVE

[75] Inventor: Kenneth K. Knapp, Battle Creek, Mich.

[73] Assignee: Eaton Corporation, Cleveland, Ohio

[21] Appl. No.: 777,256

[22] Filed: Mar. 14, 1977

[51] Int. Cl.² ............................................. F16B 9/00
[52] U.S. Cl. ...................................... 60/392; 60/433; 137/625.69; 137/625.34
[58] Field of Search .................... 60/392, 433, 389; 137/625.69, 625.3, 625.34, 85, 625.25

[56] References Cited

U.S. PATENT DOCUMENTS

| 3,166,891 | 1/1965 | Weisenback | 60/389 |
| 3,238,723 | 3/1966 | Young | 60/389 X |
| 3,696,836 | 10/1972 | Bauer | 137/625.25 |

Primary Examiner—Alan Cohan
Attorney, Agent, or Firm—Robert J. McCloskey; John W. Yakimow

[57] ABSTRACT

A valve having a body with two ports and a bore, a sleeve selectively movable within said bore and having two radially extending passages adapted for sequential communication with one of said ports upon movement of said sleeve, and a spool selectively movable within said sleeve and including a land to restrict fluid flow in said passages. The valve is used as a variable pressure control valve in a closed loop hydrostatic circuit to control the displacement of a variable displacement pump. The spool is actuated in response to a pressure difference between the high pressure and the low pressure lines of the circuit. The sleeve is manually movable. A charge pump is provided to provide control fluid to one of the ports of the valve whereby movement of the sleeve and spool within the body will result in the flow of fluid from the charge pump to one servo of the variable displacement pump and from the other servo to drain. The sleeve is provided with a set of passages having a plurality of axially spaced radially extending passages adapted for sequential communication with one of the body ports. The passages within the sleeve are constructed to provide different flow rates for fluid when they are respectively aligned with the port.

17 Claims, 5 Drawing Figures

SLEEVE SPOOL VALVE

The present invention relates generally to a valve having a spool and a sleeve which are movable relative to the valve body and more particularly to the use of such a valve as a variable pressure control valve used to control a variable displacement hydraulic pump.

Valves employing a sleeve and spool which are movable relative to each other in an axially extending bore in a valve body are well known in the valve art. Examples of such valves are illustrated in U.S. Pat. Nos. 3,040,768; 3,166,891; 3,554,213; and 3,696,836. Such valves may be used as override control valves, solenoid actuated pilot valves, pressure control valves, and flow control valves. In each of the known valves, however, there is generally provided a single passage of a given size in the sleeve which communicates with the outer periphery of the sleeve and the inner periphery of the sleeve to port fluid therebetween. In valves such as the one illustrated in U.S. Pat. No. 3,554,213, two passages may be provided but in such cases both passages are of the same size.

In attempting to use such spool-sleeve valve in a closed loop hydrostatic transmission circuit as a variable pressure control valve, an inexplainable pressure spike problem in the circuit appeared to occur upon actuation of the sleeve relative to the spool when the sleeve was returned to the centered position. It was discovered by applicant that the pressure spike could be eliminated by providing in the sleeve different sets of passages wherein different passages of each set have different flow rates. Each passage may be lined up with the port through the valve housing. In such instances, the sleeve may be selectively moved to provide fluid through one passage or an adjacent passage. By employing this type of valve in the given circuit, applicant discovered that he was able to greatly reduce the pressure spikes that had existed in the given circuit. It subsequently occurred to applicant that the solution for this given problem would also find particular applicability in other valves employing a similar spool-sleeve arrangement.

Figure 2:
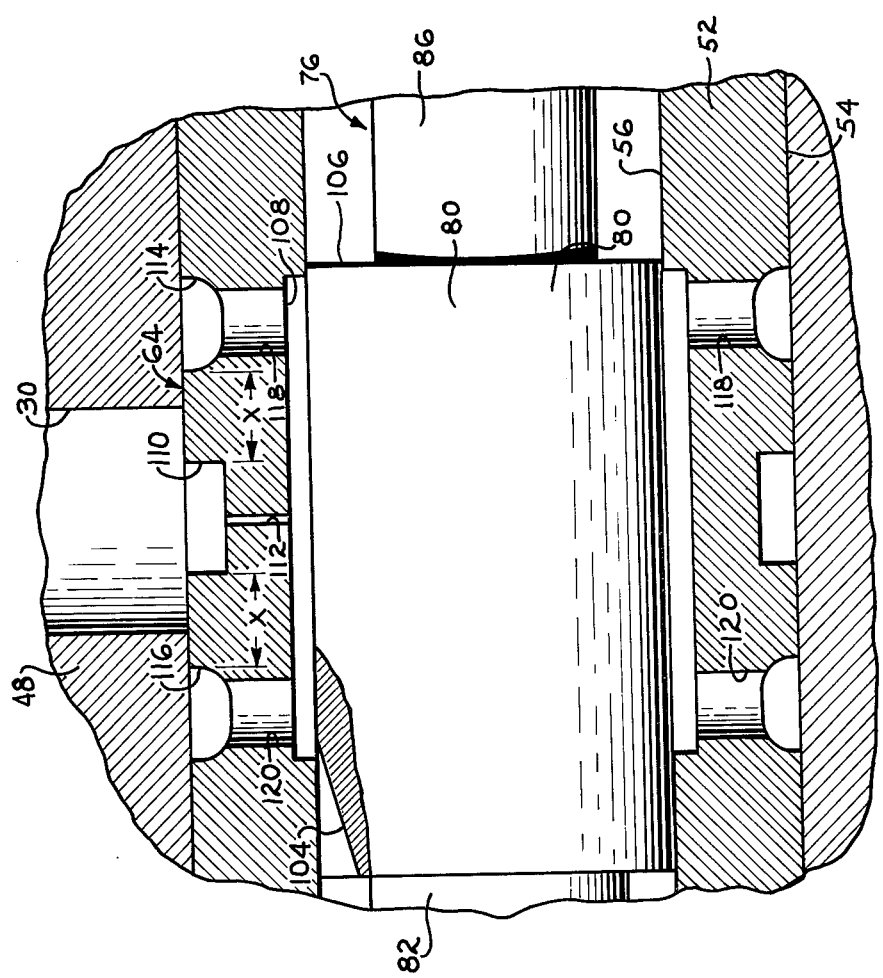
FIG. 2 is an enlarged view of a portion of FIG. 1 illustrating the interrelationship of the sleeve, spool, and valve body.
Figure 3:
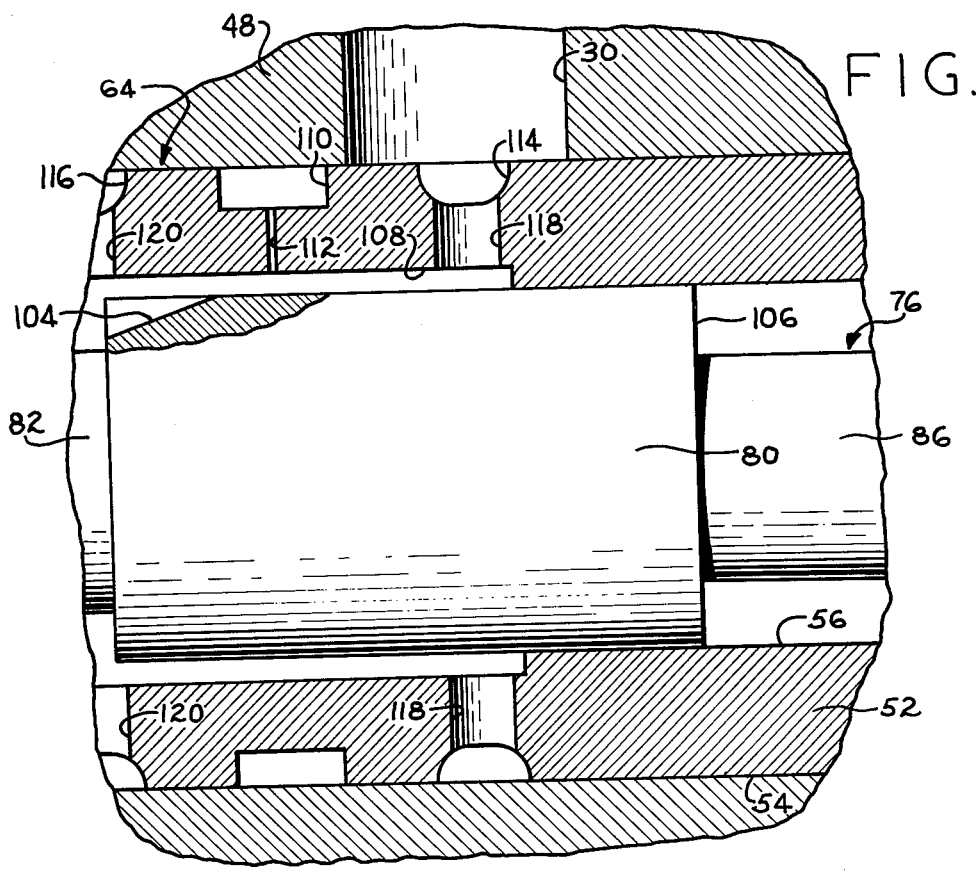
Figure 4:
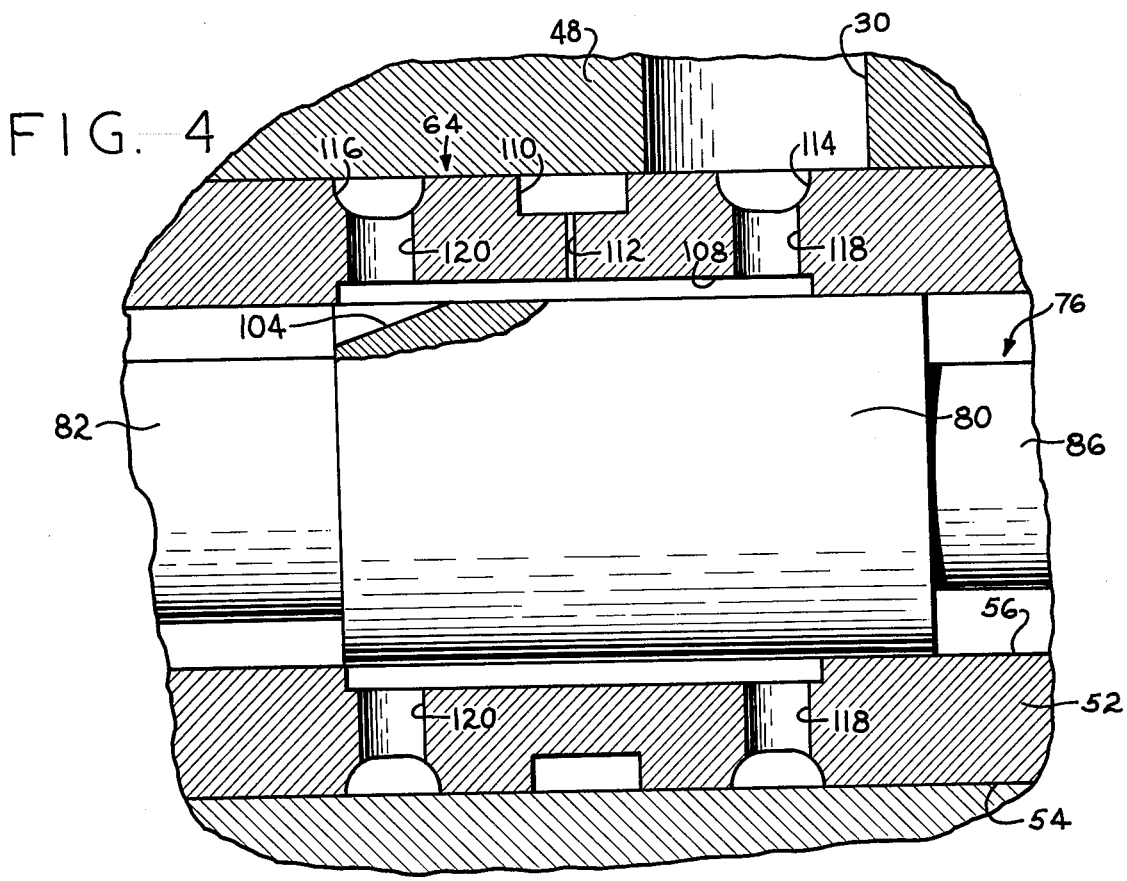
Figure 5:
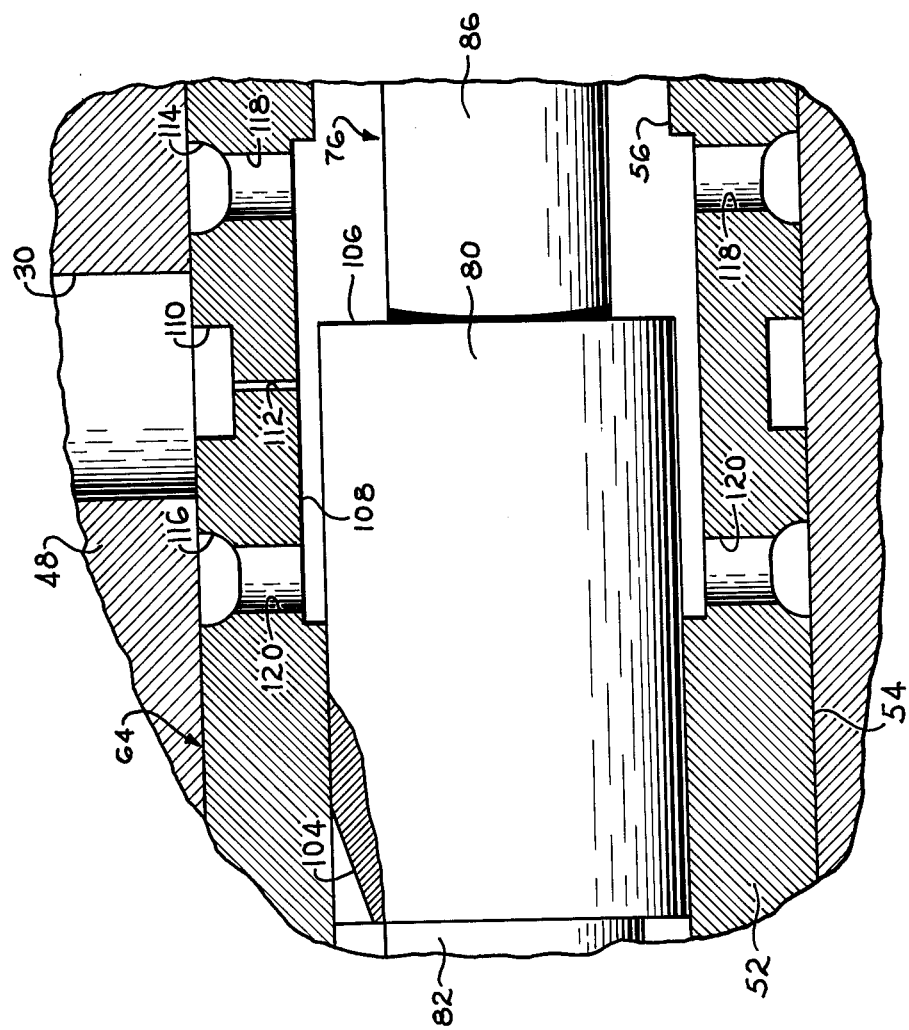
Figure 5:
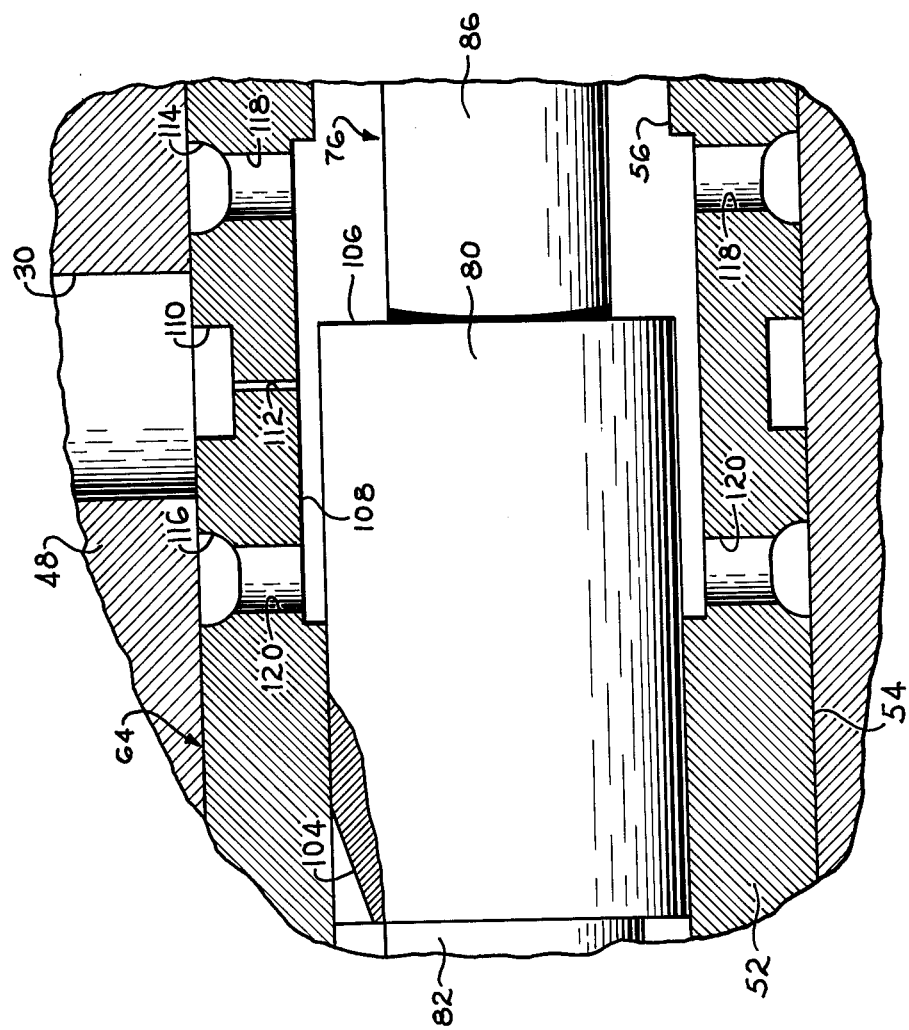

FIGS. 3, 4, and 5 are similar to FIG. 2 but illustrating different displacements of the spool, sleeve and valve body relative to one another.

Figure 1:
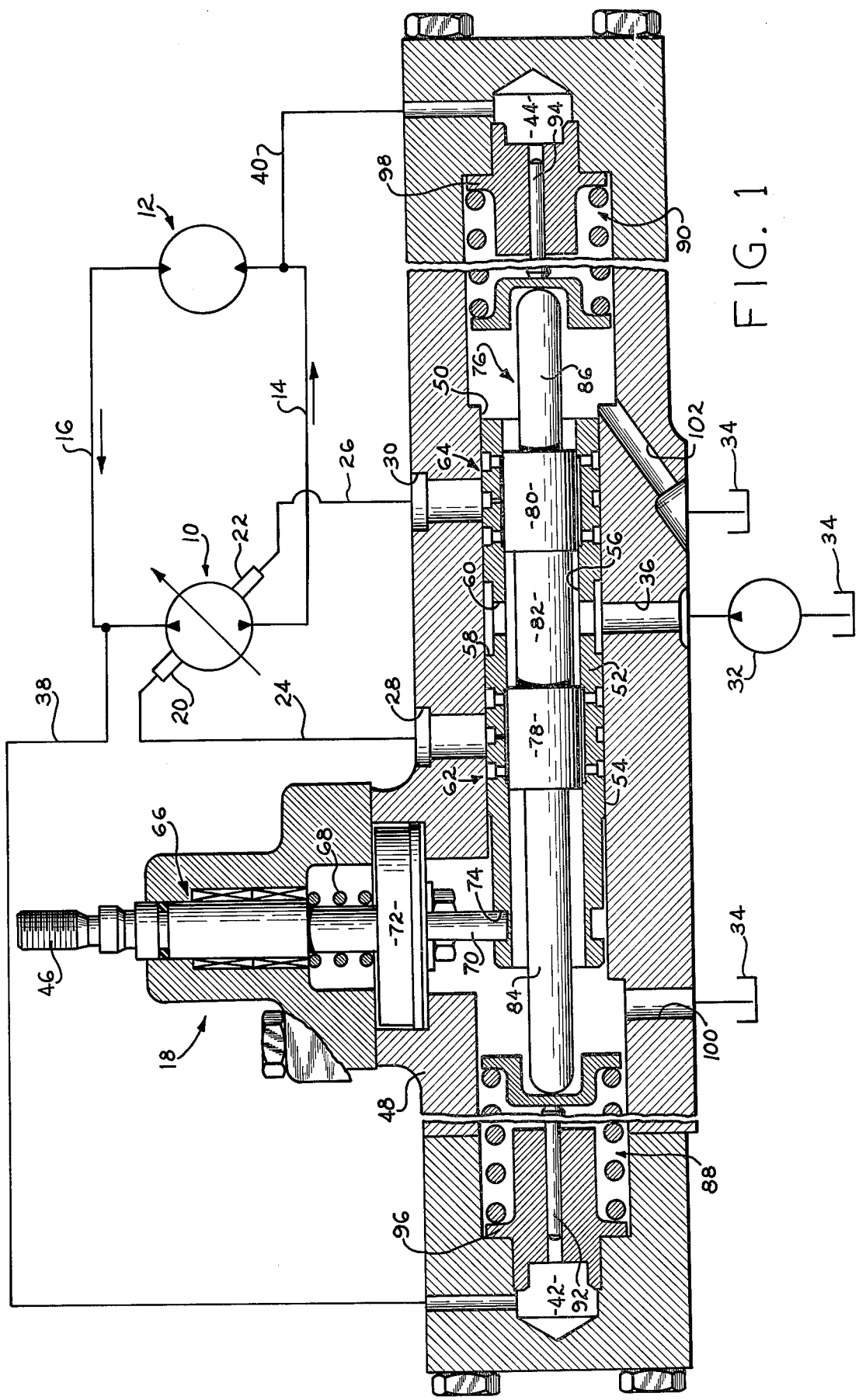
FIG. 1 is a side elevational view in section of a valve, according to the invention, in fluid communication with a hydraulic circuit.

In FIG. 1, a variable displacement hydraulic pump 10 is located in a closed loop hydrostatic transmission circuit with a hydraulic motor 12. Lines 14 and 16, respectively, direct fluid from pump 10 to motor 12 and return fluid from motor 12 to pump 10. It is contemplated that well known valving (not illustrated) would also be used in the circuit to supply make up fluid and provide pressure relief.

A spool-sleeve valve 18 is used to control the displacement of pump 10. Servos 20 and 22 of pump 10 are connected via lines 24 and 26 respectively with ports 28 and 30 of valve 18. A make up pump 32 communicates with drain 34 and with an inlet port 36 of valve 18. Lines 38 and 40, respectively communicating fluid pressure from lines 16 and 14 to chambers 42 and 44 of valve 18.

Valve 18 directs fluid from pump 32 to one of the servos of pump 10 and fluid from the other servo to drain 34. The amount of fluid directed by valve 18 to the respective servo 20 or 22 is controlled by both rotation of a shaft 46 of valve 18 and the respective pressure of the fluid within chambers 42 and 44.

As illustrated in FIG. 1, valve 18 is used as a variable pressure control valve. It may, however, find other applications for other hydraulic circuits. The disclosure therefore is directed toward the valve and its construction.

Referring in greater detail to valve 18, the valve comprises a body 48 which defines a longitudinally extending valve bore 50. A pair of concentrically nested valve elements are received in the valve bore for directing fluid from inlet port 36 to port 28 or 30 and from the other port to drain 34. As illustrated, the valve elements include a longitudinally extending sleeve 52 (used as an input member) having an outer periphery 54 in sliding engagement with bore 50 and an inner periphery 56 defining a longitudinally extending passageway. Sleeve 52 includes an annular groove 58 encircling the outer periphery 54 and in communication with inlet port 36. Groove 58 is of sufficient longitudinal length to insure communication with inlet port 36 through all positions of sleeve 52. A plurality of circumferentially spaced openings 60, four in number, are provided in sleeve 52 in fluid communication with both the longitudinally extending passageway therein and groove 58. Sleeve 52 further includes two sets of passages 62 and 64 which will be defined in greater detail with reference to FIGS. 2 through 5. Generally, however, each sets of passages 62 or 64 are in fluid communication with the outer periphery 54 and the inner periphery 56 of sleeve 52.

Means 66 are associated with shaft 46 to longitudinally position sleeve 52 in bore 50 in response to rotation of shaft 46. Such means are well known within the art and are biased to a central position by a known spring arrangement 68. As illustrated, means 66 includes an eccentrically mounted pin 70 on a cylinder 72 which is rotated by shaft 46. Pin 70 is in communication with a groove 74 within the outer periphery 54 of sleeve 52.

The other valve element is a spool 76 (used as a feedback member) that is located within the passageway of sleeve 52 and has a pair of axially spaced lands 78 and 80 in sliding engagement with inner peripheral surface 56. Intermediate lands 78 and 80 is a reduced center portion 82. On the outboard ends of land 78 and 80 are respectively located reduced end portions 84 and 86 which are respectively in contact with coil spring biased centering means 88 and 90. The periphery of each of the reduced end portions are in communication with the passageway within sleeve 52. Appropriate sized pins 92 and 94 are provided to axially move spool 76 and are respectively located in plugs 96 and 98 in each end of body 48. One end of each pin contacts spool 76 while the other end thereof is in fluid communication with the respective pressure chamber 42 and 44. The outboard ends of the passageway within sleeve 52 are in fluid communication via drain ports 100 and 102 with drain 34.

Referring now to FIG. 2 for further details of valve 18, sleeve 52 and spool 76 are illustrated in their centered position relative to body 48. A groove 108 is in communication with each set of passages 62 and 64. Each land has an axial length greater than that of groove 108 and contains a notch 104. When the sleeve and spool are centered, each land will have an outboard edge 106 slightly covering annular groove 108 and notch 104 will provide slight fluid communication between that portion of the passageway within sleeve 52 that encircles reduced center portion 82 and the respective groove 108.

Set of passages 64 in sleeve 52 includes an annular groove 110 centrally located relative to groove 108 on periphery 54 in fluid communication with a single radially extending passage 112 (e.g., 0.015 inches in diameter) that also communicates with groove 108. Set 64 further includes annular grooves 114 and 116 on periphery 54 that are located on opposite sides of groove 110. Each groove 114, 116 is in fluid communication with groove 108 via four circumferentially spaced radially extending passages on openings 118, 120, respectively, of substantial size to insure no restriction of fluid flow therebetween. Preferably, the axial dimension of groove 110 and the distance X between groove 110 and either groove 114 or 116 is great enough to insure minimal overlap between any two grooves (110, 114, 116) and port 30. These dimensions insure that in most cases fluid will flow between port 30 and the passageway within sleeve 52 via either groove 110, 114, or 116. Port 28, set of passages 62 and land 78 are constructed in a similar manner.

Valve 18, when uses as a variable pressure control valve operates in the following manner. When centered, the valve demands a zero pressure difference between lines 14 and 16. In the centered position, the spool, sleeve, and housing are located as illustrated in FIGS. 1 and 2. Shaft 46 is turned, for example, to shift sleeve 52 to the left in FIGS. 1 and 2 to the position illustrated in FIG. 3. Control fluid is ported from pump 32 to port 30 past land 80 to servo 22 thereby increasing the flow of fluid in line 14. Simultaneously, fluid flows from servo 20 to port 28 past land 78 around reduced end portion 84 to drain 34.

As the pressure of the fluid in line 14 increases, pin 94 under the pressure of the fluid in chamber 44 forces spool 76 to the left in FIGS. 1, 2, and 3 to the position illustrated in FIG. 4. As the fluid pressure continues to increase, the spool sleeve relationship acquires the position illustrated in FIG. 2 wherein adequate pressure is supplied to servo 22 to insure the displacement of pump 10 to the position chosen by the location of sleeve 52 relative to housing 48. This location is governed by the force exerted by the centering means 88 and 90 and the pressure of the fluid in chambers 42 and 44. If the pressure in line 14 exceeds the desired setting of sleeve 52, land 80 will continue to move to the left relative to sleeve 52 thereby porting fluid from port 30 around reduced end portion 86 to drain 34 and open fluid communication between pump 32 and servo 20 to deswash pump 10. This will result in a reduction of fluid flow and, accordingly, a drop in pressure in line 14. As the pressure is reduced, land 80 will again move to the right in FIG. 4 reestablishing communication both between pump 32 and servo 22 and between servo 20 and drain 34 to position the swashplate of pump 10 to the desired location demanded by sleeve 52.

When it is desired to return the pressure difference between lines 14 and 16 back to its minimum value, shaft 46 is again turned to place sleeve 52 in the position illustrated in FIG. 5. It will be noted that in this position, spool 76 at the given instance of return of sleeve 52 to its centered position, is still located in the metering position. Servo 22, accordingly, will be ported to drain via groove 110 and passage 112 of set of passages 64 while servo 20 will be ported to pump 32 via groove 110 and a passage 112 of set of passages 62. This will result in the return of pump 10 toward its neutral position causing a decrease in the pressure in line 14 relative to line 16 and a gradual movement of spool 76 to the right in FIG. 5. Eventually, the relationship between sleeve 52 and spool 76 will again acquire that position illustrated in FIGS. 1 and 2.

It should be appreciated that sleeve 52 may be shifted in the opposite direction thereby reversing the above-described procedure. The significance of the given sleeve design is that it provides two different flow rates to the ports 28 and 30 based upon whether groove 110 is in communication with the respective port or groove 114 or 116 is in communication with the respective port. It should be appreciated that different size passages 118 and 120 may be provided to further control the flow of fluid depending upon the direction of movement of sleeve 52 relative to body 48.

The advantage of the given sleeve design when used in a variable pressure control valve is that it tends to eliminate pressure spikes that had existed when the sleeve was returned rapidly from its accelerate (actuated) position to its coast (centered) position. During such return movement, the pressure of the fluid in the driving line (high pressure line) of the circuit decays rapidly but a pressure spike, frequently over 1000 psi occurs in the opposite line causing undesirable jerking in the operation of motor 12. In the prior arrangement of valves of this type, the amount of fluid flow through groove 110 was not restricted at any position. It has been determined that by using the small passage 112 for the center position of groove 110 that such a pressure spike can be substantially eliminated. However, it is also believed that the dual passage arrangement illustrated in sets of passages 62 and 64 with a spool-sleeve arrangement can find application in other systems. Accordingly, the claims of the application are first directed toward this broader concept of the given relationship between body 48, sets of passages 62 and 64 in sleeve 52, and spool 76. Narrower claims are directed toward the given application of this valve as a variable pressure control valve in a circuit similar to that illustrated in FIG. 1.

If desired, sleeve 52 can be used as the feedback and spool 76 as the input.

I claim:

1. A selectively operable valve comprising a body having two ports, a bore in said body communicating with said ports, a pair of concentrically nested valve elements movable within said bore and relative to each other for controlling fluid flow between said ports, one of said valve elements being a sleeve with an outer periphery in sliding engagement with said bore and an inner periphery, said sleeve having two axially spaced radially extending passages adapted for sequential communication with one of said body ports upon movement of said sleeve and an opening in communication with said other port and said inner periphery, said radially extending passages having different cross sectional areas to provide different degrees of fluid flow therethrough for a given fluid pressure, an annular groove on said inner periphery communicating with said radially extending passages, the other of said valve elements comprising a spool having a land in sliding engagement with said inner periphery and having an axial length sufficient to overlap said annular groove, means for displacing said sleeve relative to said body to establish communication between one of said radially extending